US010265819B1

(12) United States Patent
Gardner

(10) Patent No.: US 10,265,819 B1
(45) Date of Patent: Apr. 23, 2019

(54) STAND-ON DRILL PRESS

(71) Applicant: Kenneth Glazer Gardner, Buxton, ME (US)

(72) Inventor: Kenneth Glazer Gardner, Buxton, ME (US)

(73) Assignee: Kenneth Glazer Gardner

( * ) Notice: Subject to any disclaimer, the term of this patent is extended or adjusted under 35 U.S.C. 154(b) by 0 days.

(21) Appl. No.: 15/088,621

(22) Filed: Apr. 1, 2016

(51) Int. Cl.

| | |
|---|---|
| ***B23Q 9/00*** | (2006.01) |
| ***B23B 39/14*** | (2006.01) |
| ***B25H 1/00*** | (2006.01) |
| *B23Q 11/00* | (2006.01) |

(52) U.S. Cl.
CPC ............ *B23Q 9/0007* (2013.01); *B23B 39/14* (2013.01); *B25H 1/0064* (2013.01); *B25H 1/0078* (2013.01); *B23Q 11/005* (2013.01)

(58) Field of Classification Search
CPC ....... B23B 39/14; B23B 39/16; B23Q 9/0007; B23Q 9/0014; B23Q 11/005; B23Q 9/0028; B23Q 9/0042; B25H 1/0064; B25H 1/0078; B25H 1/0021; B25H 1/0042
USPC ....... 408/95, 97, 98, 110–114, 115 R, 115 B, 408/241 G
See application file for complete search history.

(56) References Cited

U.S. PATENT DOCUMENTS

| | | | | | |
|---|---|---|---|---|---|
| 614,848 | A * | 11/1898 | Doran | B23Q 9/00 | 144/104 |
| 1,316,027 | A * | 9/1919 | Halbreich | B23B 51/104 | 408/112 |
| 1,470,143 | A * | 10/1923 | Buterbaugh | B25H 1/0078 | 408/112 |
| 1,946,241 | A * | 2/1934 | Sailer | D05B 23/005 | 112/137 |
| 5,797,708 | A * | 8/1998 | Bencic | B23B 47/281 | 408/103 |
| 5,961,257 | A * | 10/1999 | Bettini | E01B 31/24 | 279/82 |
| 7,597,513 | B2 * | 10/2009 | Chiang | B23B 47/287 | 408/103 |
| 2009/0087272 | A1 * | 4/2009 | Hernandez | B23B 49/02 | 408/112 |

* cited by examiner

*Primary Examiner* — William V Gilbert

(57) ABSTRACT

A device 20 for guiding a power tool 10 which an operator stands on base plate 1, engages hands to both lever handles 7*a-b*. Continuing, operator presses down on both handles applying downward force. Thereby, gaining dual lever mechanical advantage for the purpose of advancing and retreating a power tool 10. Respectively, performing drilling, boring, and fastening operations at and below floor level. Particularly and most important, with operator 13 in the standing position on baseplate 1. Further including, taking advantage of total weight of an operator and tool 20 combined, holding device in place while in use.

1 Claim, 6 Drawing Sheets

STAND-ON DRILL PRESS

FIELD OF THE INVENTION

The present invention relates to a device to guide and gain leverage on a power tool performing drilling, boring, and fastening operations at and below floor level. Most importantly, allowing operator to perform said operations in the standing position. Whereby, increasing efficiency of work and decreasing expended energy by operator.

BACKGROUND OF THE INVENTION

The stand-on drill press idea came from my experience and involvement with maintenance of equipment in the heavy trucking industry. Freight trailer floors are repaired and/or replaced routinely. Whereby, requiring hundreds of predrilled holes for installing new self-tapping fastening screws through oak flooring, securing it to steel I beams. The common method today is on your knees or bent over at the waist, exerting considerable energy applying hand pressure to an air powered hand drill. Once holes are drilled, self-tapping fastening screws are installed with an air powered impact wrench. Again, on your knees or bent over from the waist. Operator fatigue and injury is common in this physically demanding and repetitious work. The present invention substantially alleviates many of these problems. When using the invention this still repetitious work uses a fraction of the physical energy expended, compared to performing said work with pistol grip drill in hand. Most prior art in a crowded field of devices to guide or increase leverage on power tools incorporates levers (U.S. Pat. No. 1,097,709 O. C. Fosselman May 26, 1914 and U.S. Pat. No. 8,596,836 McKenzie Dec. 3, 2013) or guide rods (U.S. Pat. No. 1,470,143 J. H. Buterbaugh Feb. 10, 1922 and U.S. Pat. No. 6,860,682 Michael W Le Picq Mar. 1, 2005), some incorporating both. No prior art found incorporating the operator in totality, standing on a baseplate with dual levers and guides so arranged, making them dependent on one another to function. The invention is unique and novel in several aspects described in the following specification and claims.

SUMMARY OF THE INVENTION

A device 20 for guiding a power tool 10 which operator 1 stands on base plate 1 engages hands to lever handles 7*a-b*, presses down on both handles applying downward force. Thereby, gaining dual lever mechanical advantage for the purpose of advancing and retreating a power tool 10. Subsequently, for performing drilling, boring, and fastening operations at and below floor level. Particularly and most important, with operator in the standing position on baseplate 1. Whereby, taking advantage of total weight of operator and tool 20 combined, to hold the device in place while in use. The operator's weight and tools weight combined being the only clamping force, holding tool to work. Further including, when operating the press, the operator being the powering force and connecting link from baseplate 1 to both lever handles 7 *a-b*. This invention provides an alternative way to perform difficult, repetitive operations previously pointed out. The object of the present invention is to decrease working time on your knees or bent over from the waist. Whereby making the work less fatiguing, safer, and performed in a more productive position for operator, standing on his feet.

DETAILED DESCRIPTION OF THE INVENTION

Figure 1:
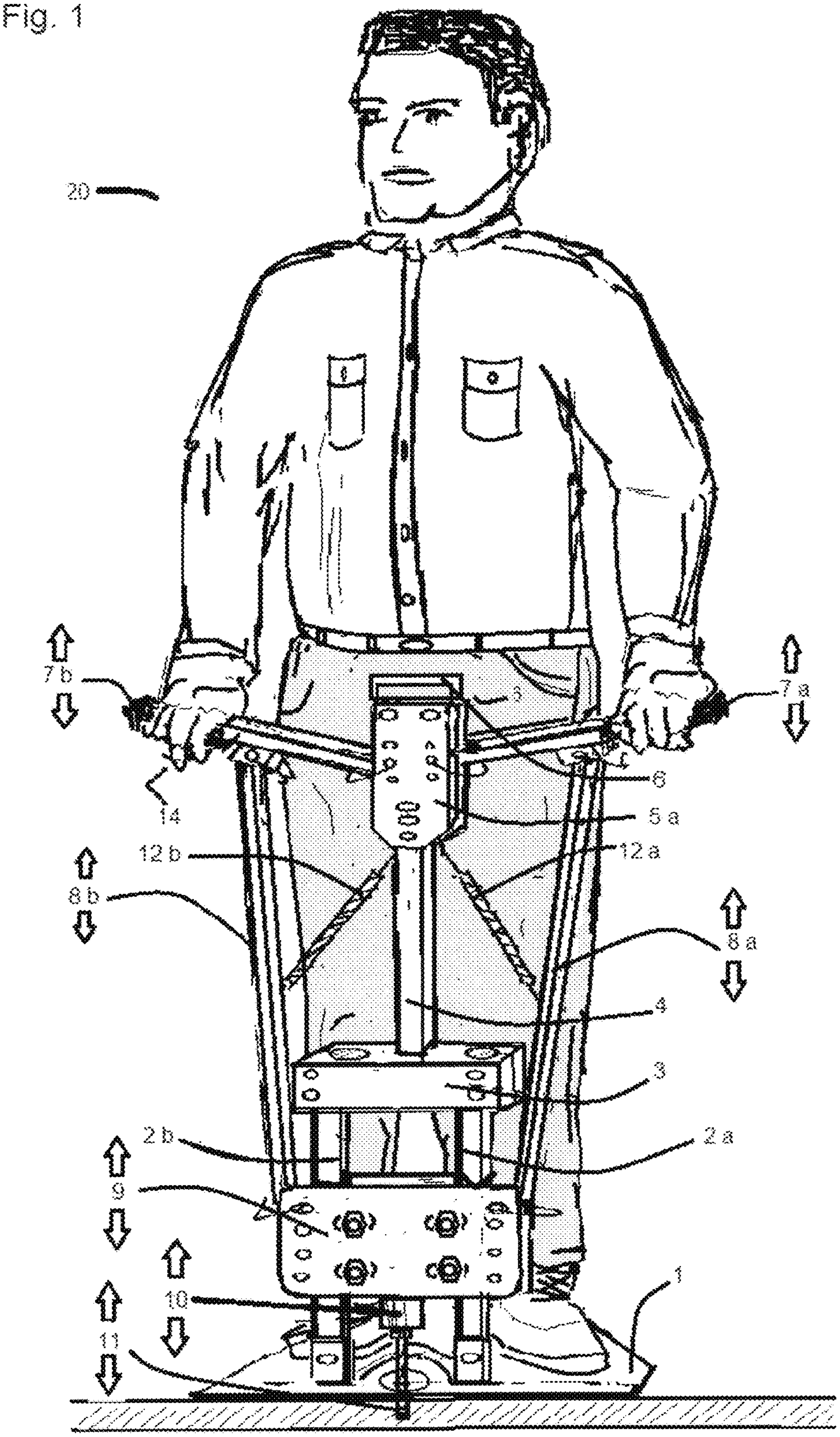
FIG. 1. Left front elevation view of the stand-on drill press. Operator standing on the tool depicting a view of the device being operated. Operator's pants are shaded to help delineate the tool from the operator. The moving parts of the press are called out with arrows above and below the character number of those parts. Also, the identical parts are identified with (a or b) after the same character number.
Figure 6:
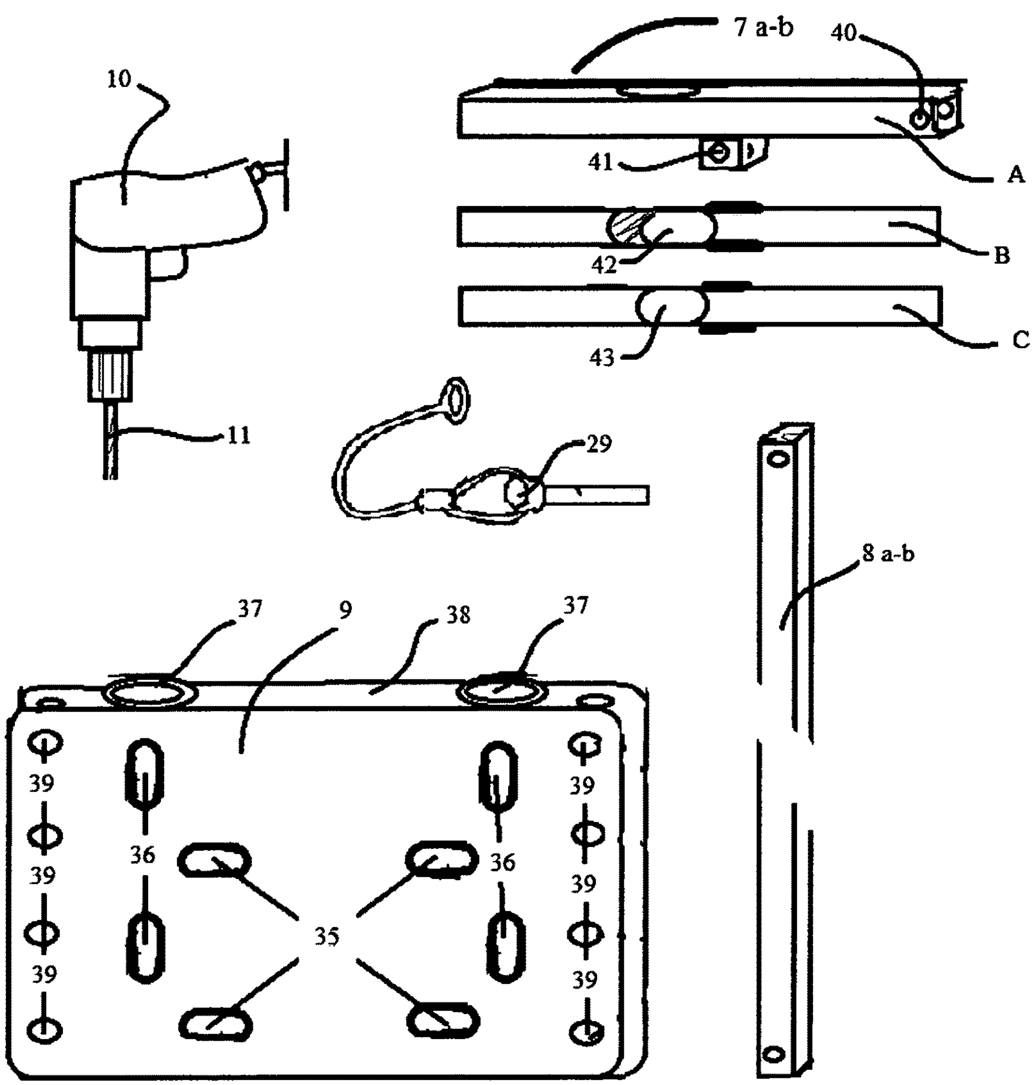
FIG. 6. View of all moving parts.

Referring to FIG. 1. A device 20 for guiding a power tool 10. Operator stands on base plate 1, engages hands to lever handles 7*a-b*, presses down on handles applying downward force. Thereby, gaining dual lever mechanical advantage for the purpose of advancing and retreating a power tool 10. Subsequently, for performing drilling, boring, and fastening operations at and below floor level. Particularly, and most important, with operator in the standing position on baseplate 1. Whereby, taking advantage of total weight of operator and tool 20 combined, to hold the device 20 in place while in use. The operator's weight and tools weight combined being the only clamping force holding tool to work piece. When operating the stand-on drill press, the operator being the powering force and connecting link from baseplate 1 to both lever handles 7*a-b* FIG. 1. Drawing best represents the movement of linkages in relationship to operator, and advancement (downward) or retreating (upward) of tool attachment plate 9, tool 10, and cutting bit 11. Refer to FIG. 6 briefly, depicting all moving components separately from the assembled press. Understanding all moving components will be helpful throughout this description.

Figure 2:
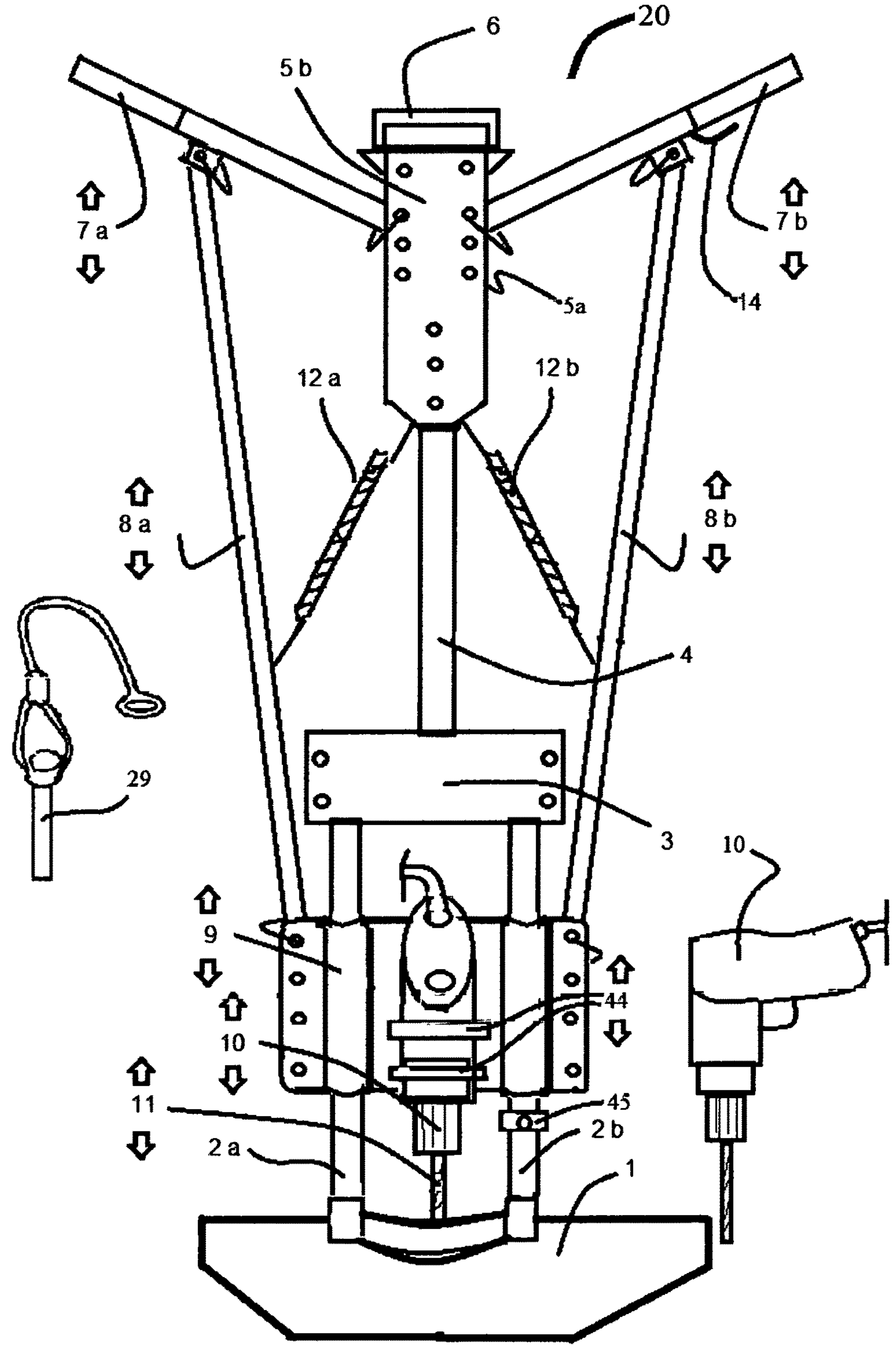
FIG. 2. Rear view of the stand-on drill press. Item 10 side view of air drill and its position when secured to attachment plate 9 with two u bolts 44.

Referring to FIG. 2. Rear view of the stand-on drill press showing an air operated drill 10, mounted to attachment plate 9. Tool attachment plate 9 slidably travels up and down on guide rods 2 *a-b* when handles 7 *a-b* are moved. Wire hitch pins 29 are used for all six linkage connection points. Handles 7 *a-b* inner ends connect to one of three upper handle adjustment apertures in both front and back of upper main frames 5 *a-b*, on both sides. Handles 7 *a-b* mid connection point connect to linkages 8 *a-b* upper end. Lower end of 8*a-b* linkages connect to each side of power tool attachment plate 9, in one of four tool height adjustment positions 39 on plate 9 (FIG. 6). Item 12 *a-b* springs which holds weight of moving parts of press in a disengaged position, keeping bit off work surface enabling operator to reposition press to next task or operation. Item 14 trigger control, air operated in this example, on the right hand lever handle 7*b*. Provisions are made for remote trigger controls in both handles 7*a-b*, and could be electric, air, or hydraulic. The plumbing, wiring, and/or routing of energy sources being known knowledge in the art, has been omitted. The absence there of, giving drawings more detail and less interference in understanding operation of moving parts. Item 45 a two piece machine collar, facilitating a means to control a predetermined depth, or control height when installed above plate 9 on guide rod 2*a* or 2*b*.

Figure 3:
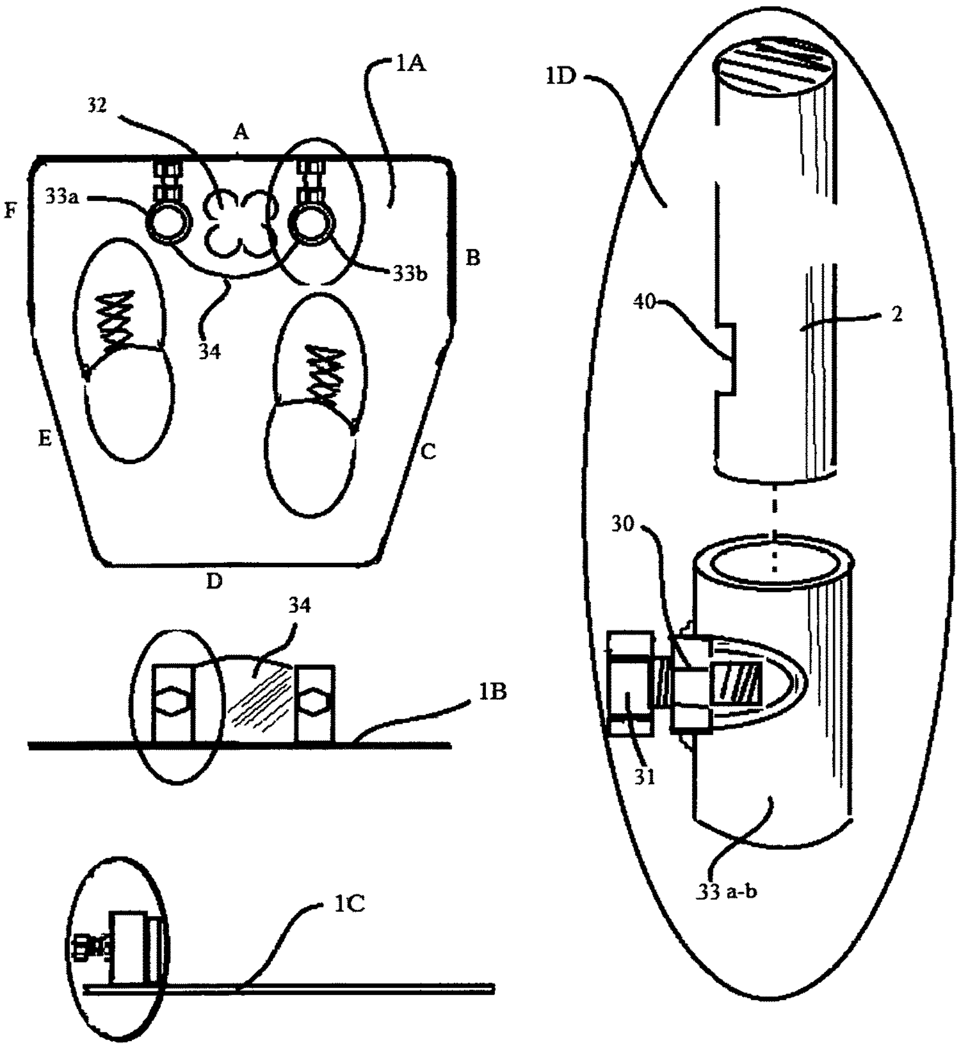
FIG. 3. Perspective views of baseplate 1. Item 1 A, a direct top view of baseplate 1 with operator shoes shown to attain reference of operator on baseplate. Item 1B. A direct frontal view. Item 1C, direct side view. Item 1D. An exploded view of baseplate 1 to guide rod 2 *a-b* securement point.
Figure 4:
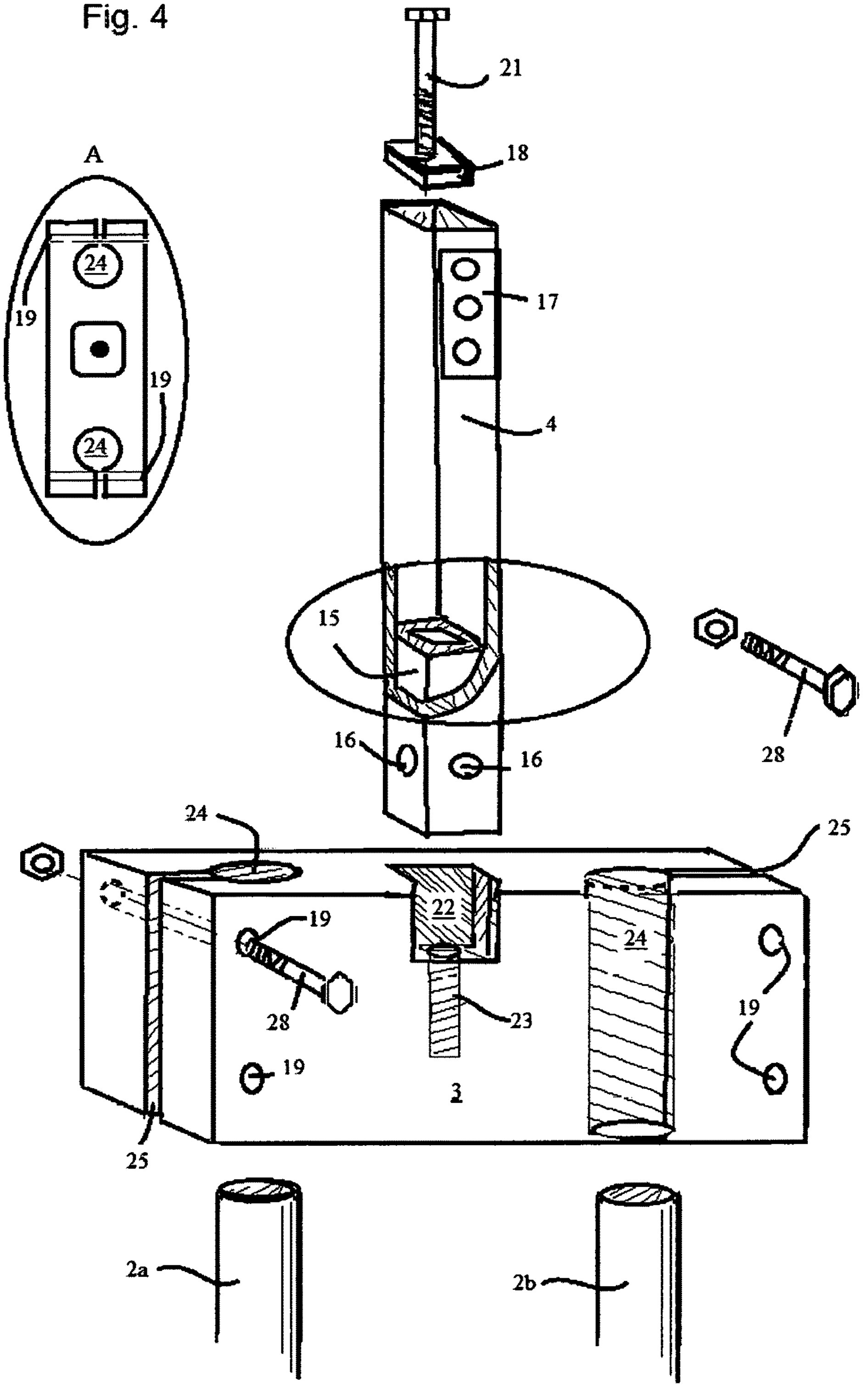
FIG. 4. Perspective view of guide rods 2 *a-b*, center mainframe 3, center support 4, and connection arrangements.

Referring to FIG. 3. Three views of baseplate and one view 1D, of guide rods 2 *a-b* to baseplate 1 connection joint arrangement. Views 1A, 1B and 1C combined, gives perspective of baseplate and where guide rods 2 *a-b* connect and extend perpendicularly up and parallel to front of baseplate side A. The oval encircled areas of 1A, 1B, 1C, showing the guide rods 2 *a-b* connection points from three angles so connection view 1D is clearly understood. Baseplate item 1A, a baseplate comprising of six sides, A, B, C, D, E, and F. Side A being the front side, sides B and F parallel to one another connect from A to C and A to E which both connect to the back side D of baseplate. The plate is shaped narrower at the rear side D to better fit operator's feet Item 32, a work access aperture bored through baseplate 1. 1D a view showing cut away section of 33 *a-b*. 33 *a-b* consisting of a piece of steel tube with two ends and an inner diameter slightly larger than outer diameter of steel guide rods 2 *a-b*. In the center of tubes outer sidewall and centered between ends, a hole is bored from outside moving inward through tubes wall. With bolt 31 threads engaging in nut 30 and through enough to centrally locate in bore and be electronically welded to 33 *a-b* making them one. Now built, 33 *a-b* are electronically welded to baseplate 1, positioned perpendicular to top of baseplate face and parallel to side A of baseplate. Head of bolt 1 facing forward side A of baseplate. Positioned equally on both sides of work access aperture 32, at a width exact to apertures 24 in mainframe 3 (FIG. 4). Easily achieved using mainframe 3 with guide rods 2 *a-b* installed serving as an assembly jig. Item 34 is a steel guard electronically welded to baseplate top, and sides of 33*a-b*. Whereby protecting operator's feet 13 from contact with cutting tools, preventing injury. Solid steel bar guide rods 2 *a-b* are inserted into tubular sockets 33 *a-b*, flat spot 40 facing jam bolt 31. When jam bolt 31 is tightened, completing a constant compression joint holding guide rods 2 *a-b* to baseplate perpendicularly and secure.

Referring to FIG. 4. Center main frame 3 a rectangular block with a front, a back, a top, a bottom and two sides. Item A is a perspective top view of mainframe 3 to better understand apertures 24 for guide rods 2*a-b* connection joint arrangement. The square hole in center of view A locates and connects center support 4 to mainframe 3. The two smaller shaded areas in view A indicating apertures from front to back to receive four bolts 28 and nuts 28. Mainframe 3, apertures 24, machined through from top to bottom sized to receive guide rods 2 *a-b* with a minimal clearance fit. The four apertures 19, two on each side of front face, traversing through mainframe 3 exiting back face will later accept bolts and nuts 28 in all four positions upon assembly. A slice 25 is made from center edges of mainframe 3, cutting from top to bottom and inwards towards bore 24. Continue cutting in, crosscutting through apertures 19 and into bore 24. A gap 25 now exists from saw cut, and can be duplicated on opposing edge. When four bolts 28 and nuts are installed and tightened, the outer edges faces, front and back of mainframe 3 compress towards each other. Subsequently, making a compression pinch joint, securing guide rods 2*a-b* to mainframe 3. Center square hole 22 is machined for a minimal clearance fit of lower end of center support 4. Support 4 inserts and bottoms out in square hole 22. Center support 4 is tubular square steel. The bottom end having a shorter and smaller outside diameter square steel tube 15, inserted into the bottom of center support 4. Steel tube 15 is electronically spot welded at four points, items 16. Holes 16 two shown and two on back sides of support 4. All four spot welds being located just above the lower inserted portion of square center support 4. Bolt 21 drops down through hole in square washer 18, both continuing down through center support 4 and welded piece 15. Washer 18 contacting top of tube 15. Whereby enabling bolt 21 threads engaging threads 23 in mainframe 3. Providing a secure one bolt connection arrangement. Top end of center support 4 item 17 is a spacer plate welded to center support 4 facilitating side clearance in top mainframe for both handle levers 7*a-b* (FIG. 2).

Figure 5:
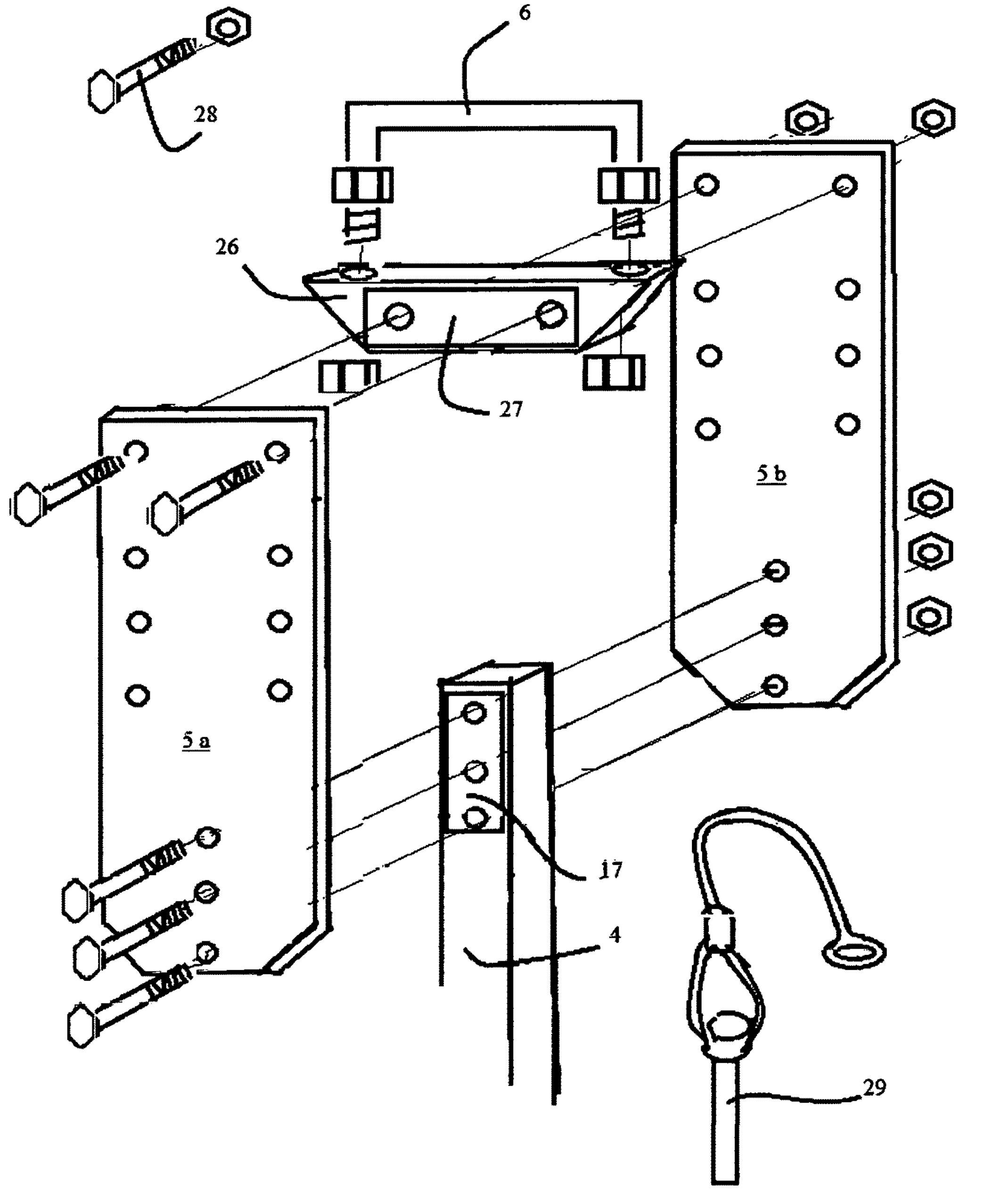
FIG. 5. Exploded view of top mainframe assembly.

Referring to FIG. 5. Top mainframe 5 *a-b* comprising of two identical rectangular pieces of aluminum flat bar. Lower ends having a 45-degree angle cut removed for appearance. Bolts and nuts 28 used in lower three apertures of 5 *a-b*, centrally located one over the other vertically and in alignment with apertures on top of center support 4. The two horizontal bolts and nuts 28 at top of mainframe 5*a-b* connecting upper main frame support 26. 26 is comprised of square tubular steel similar to square tubular steel used in center support 4 and lever handles 7 *a-b* (FIG. 2). Bolts 28 traverse through the top two and bottom three apertures of 5*a*. Continuing through spacer plates 17 and 27, through upper main frame support 26, center support 4, and all through rear mainframe 5*b*. When nuts 28 are installed and tightened, sandwiching the top support 26 and center support 4 between 5*a* and 5*b* completing upper mainframe assembly. Top mainframe support 26 square tube is cut at a 45 degree angle facilitating a top wider to accommodate a comfortable width center handle 6. The six apertures between the upper two, and lower three upper mainframe bolts 28 are where lever handles 7*a-b* connect. Handles 7 *a-b* connect in one of three positions on each side. A wire lock hitch pin 29 is used for all lever connections.

Referring to FIG. 6. The items in FIG. 6 are all the moving components of the tool, and not in proportion to one another. Handle item 7 *a-b*, two needed and identical as previously stated. Comprised of tubular steel similar to center support 4 (FIG. 1.) The three views of handle 7 *a-b*. Item A, showing front side perspective view of handle 7 *a-b* with aperture 40 nearest one end and being the connection point to upper mainframe. Steel tabs 41 electronically welded to lower face of handles 7 *a-b* providing a top connection point for linkage 8 *a-b*. Item B looking at bottom underside of handle 7 *a-b* where an elongated areas of material have been removed from square tubular steel handle. This view looking through from bottom to top indicating the top indicating the top elongated area item C 43 is slightly shorter. These provisions facilitate access for remote trigger type controls of tools. Linkages 8 *a-b* are square tubular steel similar in diameter to item 15 (FIG. 4). Linkages 8 *a-b* having two ends with one aperture traversing front to back at upper and lower ends, facilitating linkage connection points. Linkages 8 *a-b* link both handles 7 *a-b* midpoint 41 to each side of power tool attachment plate 9. A wire lock hitch pin 29 as previously mentioned, is used in any one of the four tool height adjustment apertures 39. Plate 9 is built using mainframe 3 and guide rods 2 (FIG. 2) as a jig for means to build attachment plate on. Subsequently assuring a slidably smooth and parallel arrangement. With guide rods 2 *a-b* in mainframe 3 pinch bolts 28 all tight jig is ready for use. Item 37 a tubular piece of steel to guide rod sockets (33 *a-b* FIG. 3), the length being the same as the height of power tool attachment plate 9. Power tool attachment plate construction, using previously mentioned jig on work bench. Slide two tubes 37 onto guide rods 2 *a-b*, and in contact with mainframe 3. Plate 9 has four elongated holes item 36, facilitating areas to electronically weld plates to tubes 37 making them one. Make sure tubes 37 and plate 9 contact mainframe 3 before welding keeping all in alignment. At the top between two tubes 37 a piece of strap steel 38 is electronically welded to top of power tool attachment plate and the inner top side faces of tubes 37 making them one. This top piece 38 subsequently contacts the top area of drill 10 in this example, ensuring all pressure and force created is applied to tools spine. Items 39 are apertures for adjusting height of power tool and/or height of handles. On the outside edge of tube 37 a steel flat bar of equal length having four apertures lining up to apertures 39 shown on plate 9. The flat bar is electronically welded to the linier side of round tube 37 with 39 apertures front and back lining up and completing connection points for linkage 8*a-b* to power tool attachment plate 9. Again with a wire lock hitch pin 29. Item 35 indicating elongated holes arranged in a manner facilitating tool attachment. Referring back briefly to FIG. 2, looking at power tool 10 gives good perspective of u bolts 44 which attaches air drill 10 securely to plate 9. The elongated apertures 35 provide adjustments for different diameter tools and u bolt mounting arrangements and/or adaptive plates for specific needs.

Although the invention has been described in detail for the purpose of illustration, it is understood that such detail is solely for that purpose, and variations can be made therein by those skilled in the art without departing from the spirit and scope of the invention which is defined by the following claims.

I claim:

1. A device to guide and gain leverage on a power drill or driver comprising:

a baseplate having a top face and a bottom face opposite said top face and a work access aperture substantially centered at a front portion of said baseplate;

a first guide rod and a second guide rod, each said guide rod having a longitudinal axis, each said guide rod being secured to said top face of said baseplate and each said longitudinal axis being perpendicular to said top face, said work access aperture being between said first guide rod and said second guide rod, each said guide rod having a top;

a tool attachment plate slidably engaging said guide rods;

a center mainframe having a top surface, said center mainframe securing said top of said first guide rod to said top of said second guide rod;

a center support having a longitudinal axis, said center support extending from a top portion of said center mainframe;

a top mainframe including: a top handle and a front plate and a rear plate, said front and rear plates secured to said center support, a first lever handle and a second lever handle extending from said top mainframe; and a first linkage member connecting said first lever handle to said attachment plate and a second linkage member connecting said second lever handle to said attachment plate;

whereby, when said device is in an operating position, movement of said lever handles in an advancing direction or a retreating direction with respect to said baseplate facilitates respective advancing or retreating of said attachment plate with respect to said base plate via said first linkage member and said second linkage member.

* * * * *